United States Patent
Sumner et al.

(10) Patent No.: US 7,695,035 B2
(45) Date of Patent: Apr. 13, 2010

(54) PET WASTE COLLECTION TOOL WITH INTEGRATED LEASH

(76) Inventors: James Ronald Sumner, 32802 Valle Rd., #116, San Juan Capistrano, CA (US) 92675; Tamala Loraine Hooper, 32802 Valle Rd., #116, San Juan Capistrano, CA (US) 92675; Gaspar G. Rodriguez, 3420 Olive Ave., Hunington Park, CA (US) 90255

( * ) Notice: Subject to any disclaimer, the term of this patent is extended or adjusted under 35 U.S.C. 154(b) by 51 days.

(21) Appl. No.: 12/106,321

(22) Filed: Apr. 20, 2008

(65) Prior Publication Data

US 2009/0261605 A1    Oct. 22, 2009

(51) Int. Cl.
*A01K 29/00* (2006.01)
*E01H 1/12* (2006.01)

(52) U.S. Cl. .................................. 294/1.4; 294/104
(58) Field of Classification Search ............... 294/1.3, 294/1.4, 1.5, 55, 19.1, 50.9; 15/257.6; 119/161
See application file for complete search history.

(56) References Cited

U.S. PATENT DOCUMENTS

| | | | | |
|---|---|---|---|---|
| 3,139,299 A | * | 6/1964 | Bowen | 294/1.4 |
| 4,146,260 A | * | 3/1979 | Carrington | 294/1.5 |
| 4,192,539 A | * | 3/1980 | Broyles et al. | 294/19.1 |
| 4,225,174 A | * | 9/1980 | Hennessy et al. | 294/1.4 |
| 4,547,010 A | * | 10/1985 | Camp | 294/50.9 |
| 5,174,620 A | * | 12/1992 | Huegelmeyer et al. | 294/1.3 |
| 6,237,972 B1 | * | 5/2001 | Jung | 294/1.4 |
| 7,261,347 B2 | * | 8/2007 | Krieger | 294/1.4 |

* cited by examiner

*Primary Examiner*—Dean J Kramer
(74) *Attorney, Agent, or Firm*—InterContinental IP; Eric Hanscom; Todd Langford

(57) ABSTRACT

A pet waste collection tool includes a body portion, a retractable trigger, a scoop portion, a chain, a leash attachment member, and a leash. The body portion may include a first end, a second end, and a handle portion. The retractable trigger may be coupled on one end to the body portion. The scoop portion may be coupled to the body portion and may comprise a fixed member coupled to the second end and a pivotal member coupled to the fixed member. The chain may be coupled on one end to the trigger and on the other end to the pivotal member such that when the trigger is in a first position the scoop portion is in an open position and when the trigger is in a second position the scoop portion is in a closed position. The leash attachment member may be rotatably coupled to the first end.

11 Claims, 4 Drawing Sheets

PET WASTE COLLECTION TOOL WITH INTEGRATED LEASH

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

Field of the Invention

The invention relates to the general field of handheld devices, and more specifically toward a pet waste collection tool having an integrated leash.

When being walked, pets frequently have the need to answer nature's call. In many instances, this requires the pet owner to "clean up" after their pet. Such activity typically occurs by the pet owner bending down and using their hands to scoop the pet waste into a plastic bag. Such a method may present difficulty for pet owners who are not flexible or able to bend in such a position. Further, some pet owners may not want to risk potential contact with the pet waste and may opt not to clean up after their pet. Such behavior can anger property owners, can lead to uncleanly walking areas, and can increase the spread of bacteria and disease—all of which is undesirable. To alleviate the problem, some pet waste collection tools have been developed. While helpful, it is difficult for some pet owners to use such a tool in one hand while trying to contain their pet on a leash with the other hand.

Therefore, there is a current need for a pet waste collection tool having an integrated leash that is lightweight, compact, and easy to use.

The current invention provides just such a solution by having a pet waste collection tool that includes a body portion, a retractable trigger, a scoop portion, a chain, a leash attachment member, and a leash. The body portion may include a first end, a second end, and a handle portion. The retractable trigger may be coupled on one end to the body portion. The scoop portion may be coupled to the body portion and may comprise a fixed member coupled to the second end and a pivotal member coupled to the fixed member. The chain may be coupled on one end to the trigger and on the other end to the pivotal member such that when the trigger is in a first position the scoop portion is in an open position and when the trigger is in a second position the scoop portion is in a closed position. The leash attachment member may be rotatably coupled to the first end.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

SUMMARY OF THE INVENTION

One embodiment of the invention provides a pet waste collection tool including a body portion, a retractable trigger, a scoop portion, a chain, a leash attachment member, and a leash. The body portion may include a first end, a second end, and a handle portion. The retractable trigger may be coupled on one end to the body portion. The scoop portion may be coupled to the body portion and may comprise a fixed member coupled to the second end and a pivotal member coupled to the fixed member. The chain may be coupled on one end to the trigger and on the other end to the pivotal member such that when the trigger is in a first position the scoop portion is in an open position wherein the distal end of the pivotal member does not contact the fixed member. When the trigger is in a second position the scoop portion is in a closed position wherein the distal end of the pivotal member contacts the fixed member. The leash attachment member may be rotatably coupled to the first end. The leash is coupled to the leash attachment member.

Another embodiment of the pet waste collection tool may include a scoop portion attachment member coupled to the body portion. The scoop portion attachment member may be disengagably coupled to a first end of the fixed member, wherein one end of the scoop portion attachment member is slidably coupled to the body portion and the scoop portion can be inserted into the distal end of the scoop portion attachment member and snapped into place. The scoop portion attachment member may be slidably translated towards the first end of the body portion along an axis of the body portion to disengage the first end of the fixed member from the scoop portion attachment member, allowing a user to remove the scoop portion from the body portion.

Another embodiment of the pet waste collection tool may include a scoop portion attachment member coupled to the body portion. The scoop portion attachment member may be disengagably coupled to a first end of the fixed member. The scoop portion attachment member may contain internal threads on the distal end thereof and the first end of the fixed member may contain external threads, such that the distal end of the scoop portion attachment member may be screwed to the first end of the fixed member.

In other embodiments of the pet waste collection tool, the tool may include a removable sleeve attached to both the fixed member and the pivotal member, the leash may be a retractable leash, and at least a portion of the body portion may be adjustable in length. In some embodiments, the fixed member and the pivotal member may each contain a curved planar region, wherein a removable sleeve can be disposed over the curved planar region of both the fixed member and the pivotal member.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

Figure 1:
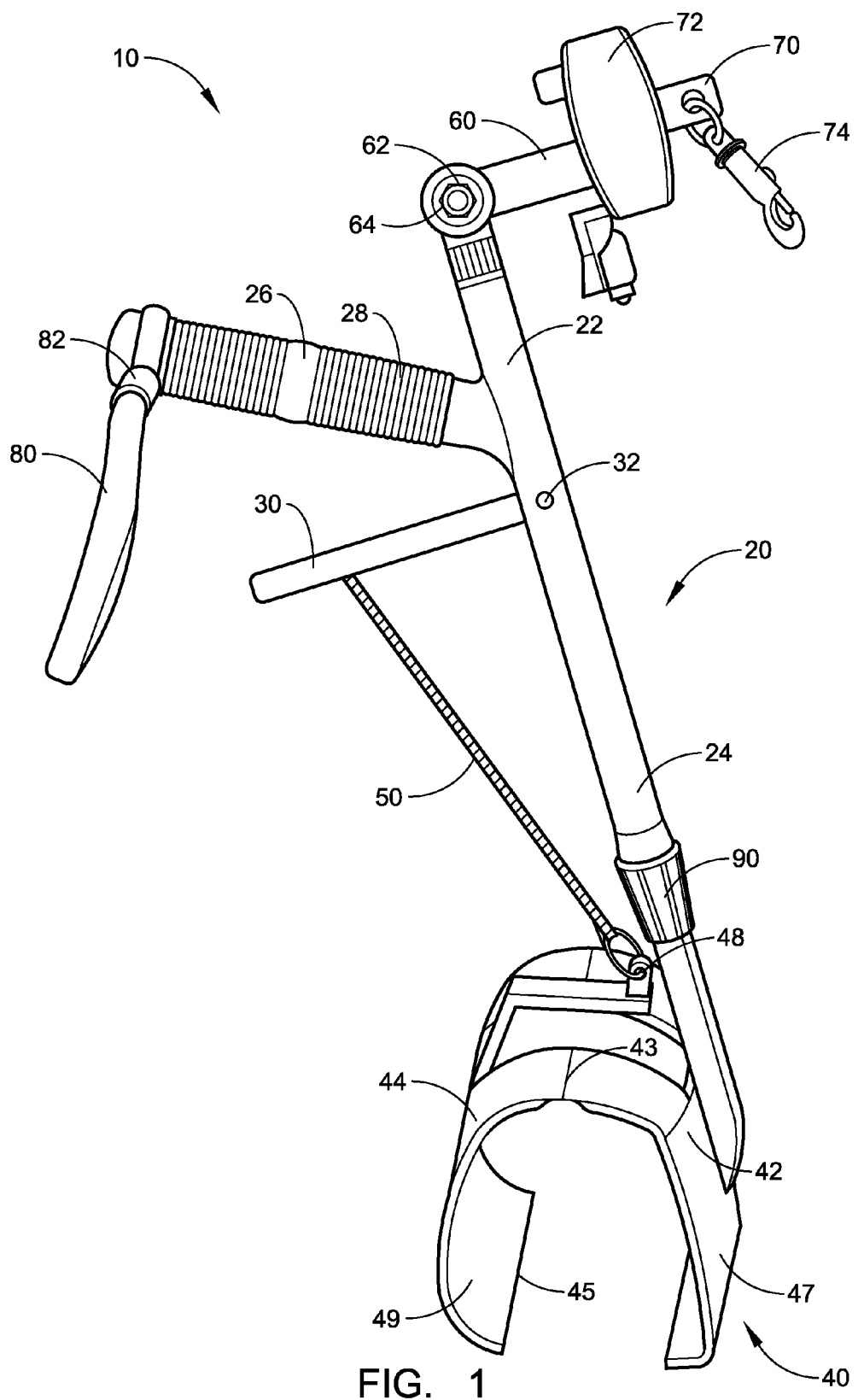
FIG. 1 shows a side perspective view of an embodiment of the pet waste collection tool with integrated leash with the scoop portion in the open position.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 shows side perspective view of an embodiment of the pet waste collection tool 10. Tool 10 may include a body portion 20, a retractable trigger 30, a scoop portion 40, a chain 50, a leash attachment member 60, and a leash 70.

Figure 2:
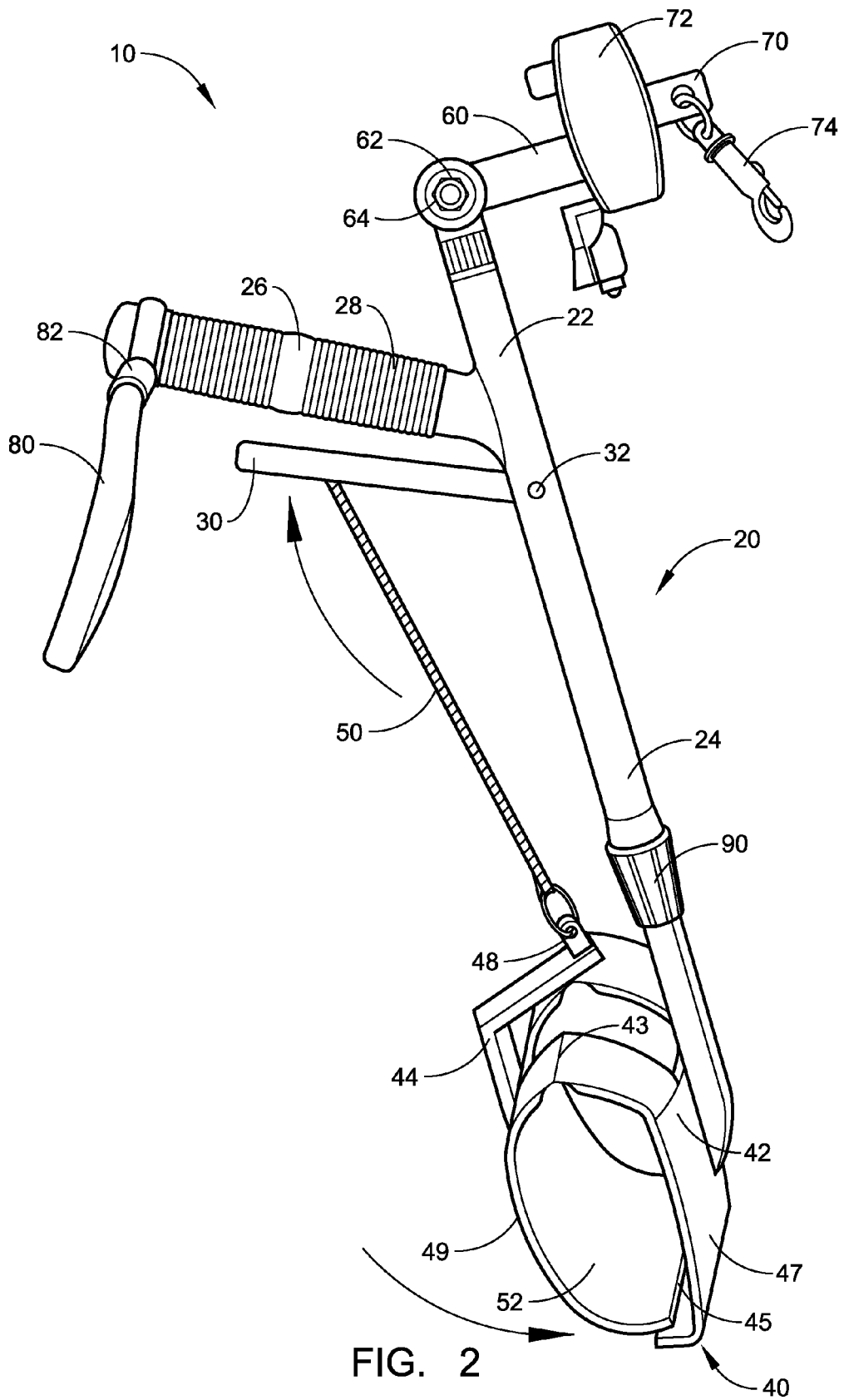
FIG. 2 shows a side perspective view of an embodiment of the pet waste collection tool with integrated leash with the scoop portion in the closed position.

Body portion 20 may include a first end 22, a second end 24, and a handle portion 26. Body portion 20 may be comprised of various materials, including light-weight polymer based materials. In some embodiments, handle portion 26 may contain a textured surface 28 thereon to provide a user increased grip of tool 10. Surface 28 may be integrated into handle portion 26 or may cover handle portion 26. Trigger 30 may be coupled on one end to body portion 20 and may be rotated about a pin 32. Scoop portion 40 may be coupled to body portion 20 and may comprise a fixed member 42 coupled to second end 24, and a pivotal member 44 coupled to fixed member 42. Fixed member 42 and pivotal member 44 may be comprised of various materials, such as plastic. In some embodiments, pivotal member 44 may be coupled to fixed member 42 by a pin 43, wherein pivotal member 44 rotates about pin 43 when a user pulls trigger 30 to cause scoop portion to move from an open position (as shown in FIG. 1) to a closed position (as shown in FIG. 2). When scoop portion 40 is in a closed position, fixed member 42 and pivotal member 44 may form a containment region 52, wherein pet waste may be contained for disposal.

Chain 50 may be coupled on one end to trigger 30 and on the other end to pivotal member 44 such that when trigger 30 is in a first position scoop portion 40 is in an open position, wherein the distal end 45 of pivotal member 44 does not contact fixed member 42. Chain 50 may be comprised of various materials, including metal. In some embodiments, chain 50 may comprise a cord, rope, or other coupling member. When trigger 30 is in a second position scoop portion 40 is in a closed position wherein distal end 45 contacts fixed member 42. In some embodiments, trigger 30 may be biased in the first position. In some embodiments, pivotal member 44 may include a chain attachment portion 48 extending therefrom, wherein chain 50 is coupled to chain attachment portion 48. Chain attachment portion 48 may have a hooked end, wherein chain 50 is hooked to the hooked end. In other embodiments, chain 50 may be attached to chain attachment portion 48 by a pin or other securing member (not shown). To cause scoop portion 40 to be in a closed position from an open position, a user may exert a force on trigger 30 in a direction towards handle portion 26 to cause trigger 30 to rotate about pin 32. When this occurs, chain 50 may exert a force on chain attachment portion 48, causing pivotal member 44 to pivot about pin 43 and to contact fixed member 42.

Leash attachment member 60 may be rotatably coupled to first end 22. In some embodiments, leash attachment member 60 may be rotatably coupled to first end 22 by a bolt 62, secured to first end 22 by a nut 64. A user may rotate leash attachment member 60 about first end 22 by loosening nut 64, moving leash attachment member 60 to a desired position, then tightening nut 64. Leash 70 may be coupled to leash attachment member 60. As an example, leash 70 may be a retractable leash, wherein leash 70 is primarily contained within a housing 72 and can be extended from and retracted within housing 72. Leash 70 may include a hook mechanism 74 to allow leash 70 to be connected to the collar or harness of a pet. Tool 10 may further include a shoulder strap 80 attached to handle portion 26. Alternatively, the shoulder strap can be a wrist strap used to secure the device around a user's wrist. Shoulder strap 80 may be comprised of leather, nylon, or any other flexible material. In some embodiments, shoulder strap 80 may be slid over handle portion 26 and secured thereto by a clamp 82. Shoulder strap 80 may allow for the hands-free carrying of tool 10 to provide maximum movement of a user's arms during walking.

In some embodiments, fixed member 42 and the pivotal member 44 may each contain a curved planar region 47 and 49, wherein when scoop portion 40 is in the closed position, the curved planar regions 47 and 49 are substantially opposed to one another to form a containment region 52 wherein pet waste can be secured therein. In some embodiments, tool 10 may further include a removable sleeve attached to fixed member 42 and pivotal member 44. In embodiments where tool 10 includes curved planar regions 47 and 49, the removable sleeve may be designed to slide over curved planar regions 47 and 49, such that when pet waste is being collected using tool 10 it does not directly contact fixed member 42 or pivotal member 44. After the pet waste has been collected, the removable sleeve may be removed from fixed member 42 and pivotal member 44 for disposal.

For example, a bag may be placed over pivotal member 44 and fixed member 42. The external portion of the bag near the lip could be folded back such that the external portion of the bag would be in contact with pivotal member 44 and fixed member 42. The containment region 52 would then be bounded by the internal surface of the bag. A user could then use the device to collect waste. After scoop portion 40 is changed to a closed position containing waste, a user can pull the folded back sides of the waste bag down and seal off the bag. Then, the user can release trigger 30 causing scoop portion 40 to open thereby releasing the bag with the waste collected inside of it.

Figure 3:
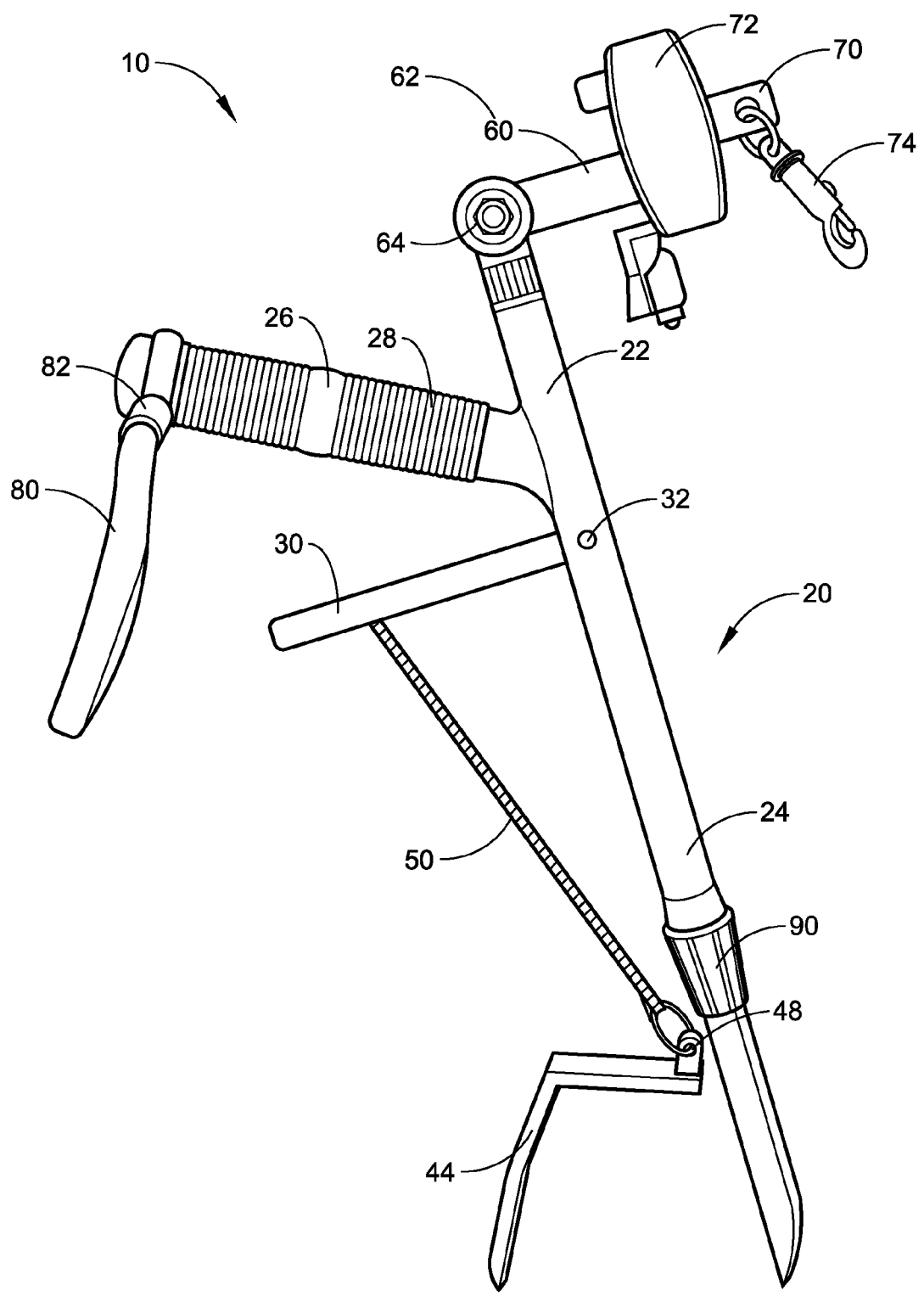
FIG. 3 shows a partial cross-section view of an embodiment of the scoop portion attachment member and its connection to the fixed member.

Referring now to FIG. 3, there is shown a partial cross-section view of an embodiment of the scoop portion attachment member 90 and its connection to fixed member 42. In some embodiments, tool 10 may include a scoop portion attachment member 90 coupled to body portion 20. Scoop portion attachment member 90 may be disengagably coupled to a first end of fixed member 42. Scoop portion attachment member 90 may contain internal threads (not shown) on the distal end thereof. In these embodiments, the distal end of scoop portion attachment member 90 may be screwed to the first end of fixed member.

Figures 4, 5:
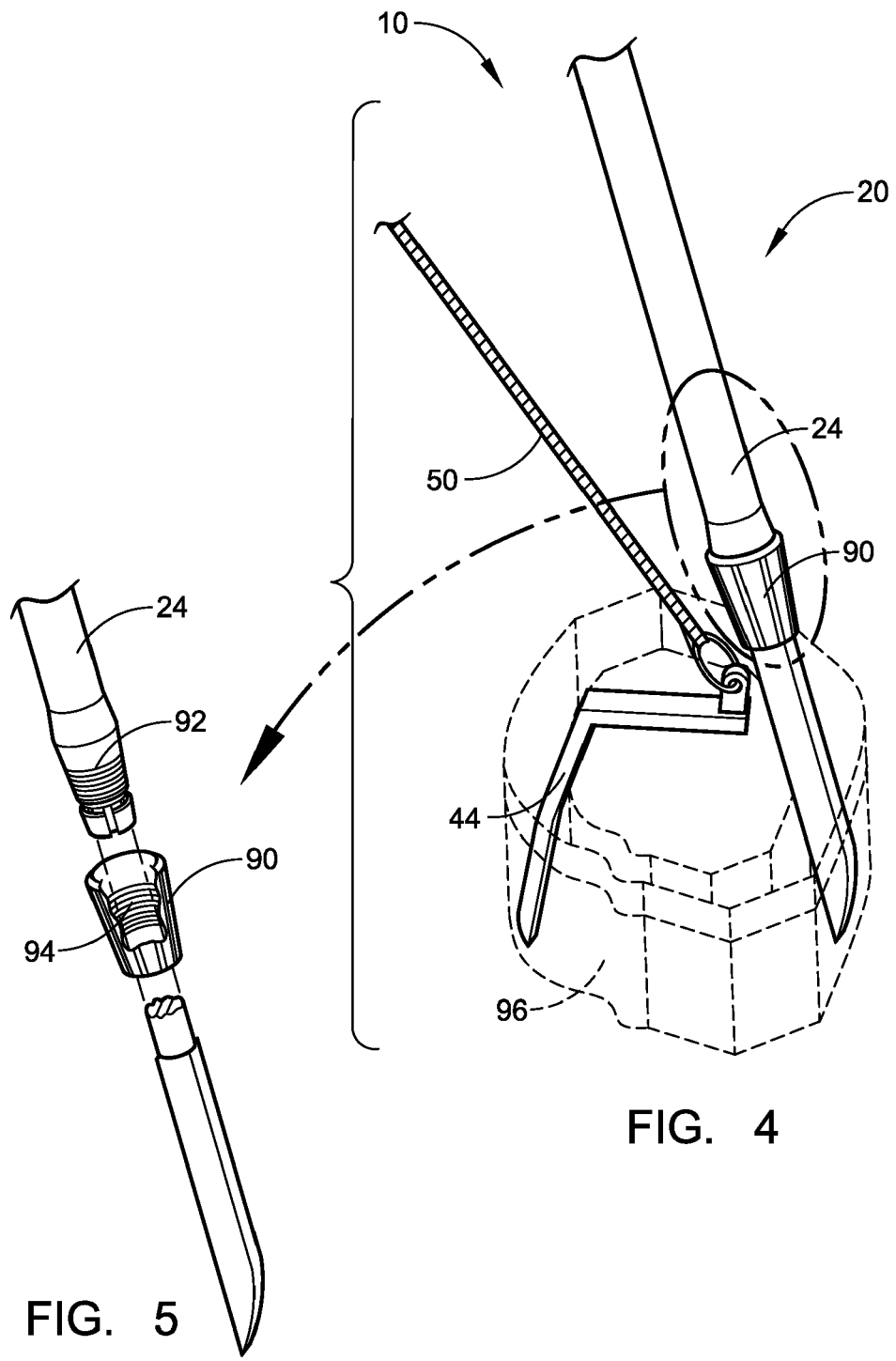
FIG. 4 shows a partial cross-section view of an embodiment of the scoop portion attachment member and a removable sleeve that encompasses the fixed and pivotal members.
FIG. 5 shows an expanded view of the connection between the scoop portion and the body portion.

FIG. 4 shows a partial cross-section view of an embodiment of the scoop portion attachment member and a removable sleeve that encompasses the fixed and pivotal members. Scoop portion attachment member is shown in closer detail in FIG. 5. A removable sleeve 96 that encompasses the fixed and pivotal members is shown in dashed lines. The removable sleeve is shown as a bag, where the bottom of the bag is inserted between the fixed and pivotal members and the top edges are folded over and around the fixed and pivotal members.

FIG. 5 shows an expanded view of the connection between the scoop portion and the body portion. The second end 24 of the of the body portion includes external threads 92. The scoop portion attachment member 90 includes internal threads 94 such that the internal threads 94 of the scoop portion attachment member 90 mate with the external threads 92 of the second end 24 of the body portion.

What I claim is:

1. A pet waste collection tool comprising:
    a body portion having a first end, a second end, and a handle portion extending therefrom;
    a retractable trigger coupled on one end to the body portion;
    a scoop portion coupled to the body portion, the scoop portion comprising a fixed member coupled to the second end and a pivotal member coupled to the fixed member;
    a means for coupling, where the means for coupling couples one end to the trigger and the other end to the pivotal member such that when the trigger is in a first position the scoop portion is in an open position wherein the distal end of the pivotal member does not contact the fixed member and when the trigger is in a second position the scoop portion is in a closed position wherein the distal end of the pivotal member contacts the fixed member;
    a leash attachment member rotatably coupled to the first end;
    a leash coupled to the leash attachment member;
    a scoop portion attachment member coupled to the body portion, wherein the scoop portion attachment member is disengagably coupled to a first end of the fixed member, and wherein the scoop portion attachment member contains internal threads on the distal end thereof and the first end of the fixed member contains external threads, wherein the distal end of the scoop portion attachment member is screwed to the first end of the fixed member.

2. The pet waste collection tool of claim 1 further comprising a shoulder strap attached to the handle portion.

3. The pet waste collection tool of claim 1 further comprising a removable sleeve attached to the fixed member and the pivotal member.

4. The pet waste collection tool of claim 1, wherein the leash is a retractable leash.

5. The pet waste collection tool of claim 1, wherein the handle portion contains a textured surface.

6. The pet waste collection tool of claim 1, wherein the pivotal member is coupled to the fixed member by a pin, wherein the pivotal member rotates about the pin.

7. The pet waste collection tool of claim 6, wherein the trigger is biased in the first position.

8. The pet waste collection tool of claim 1, wherein the means for coupling is a chain.

9. The pet waste collection tool of claim 8, wherein the pivotal member contains a chain attachment portion extending therefrom, wherein the chain is coupled to the chain attachment portion.

10. The pet waste collection tool of claim 1, wherein the fixed member and the pivotal member each contain a curved planar region, wherein when the scoop portion is in the closed position the curved planar regions are substantially opposed to one another to form a containment region wherein pet waste can be secured.

11. A pet waste collection tool consisting of:
    a body portion having a first end, a second end, and a handle portion extending therefrom, wherein at least a portion of the handle portion contains a textured surface to provide for increased grip;
    a retractable trigger coupled on one end to the body portion;
    a shoulder strap attached to the handle portion;
    a scoop portion coupled to the body portion, the scoop portion comprising a fixed member coupled to the second end and a pivotal member coupled to the fixed member by a pin, wherein the pivotal member rotates about the pin, the pivotal member having a chain attachment portion extending therefrom, wherein the fixed member and the pivotal member each contain a curved planar region, wherein a removable sleeve can be disposed over the curved planar region of both the fixed member and the pivotal member;
    a chain coupled on one end to the trigger and on the other end to the chain attachment portion such that when the trigger is in a first position the scoop portion is in an open position wherein the distal end of the pivotal member does not contact the fixed member and when the trigger is in a second position the scoop portion is in a closed position wherein the distal end of the pivotal member contacts the fixed member;
    a leash attachment member rotatably coupled to the first end;
    a retractable leash coupled to the leash attachment member; and
    a scoop portion attachment member coupled to the body portion, wherein the scoop portion attachment member is disengagably coupled to a first end of the fixed member, wherein the scoop portion attachment member contains internal threads on the distal end thereof and the first end of the fixed member contains external threads, wherein the distal end of the scoop portion attachment member is screwed to the first end of the fixed member, wherein when the scoop portion is in the closed position the curved planar regions are substantially opposed to one another to form a containment region wherein pet waste can be secured.

* * * * *